March 26, 1968 — W. E. TREVATHAN — 3,374,696
BIT MEANS
Filed Feb. 23, 1966 — 3 Sheets-Sheet 1
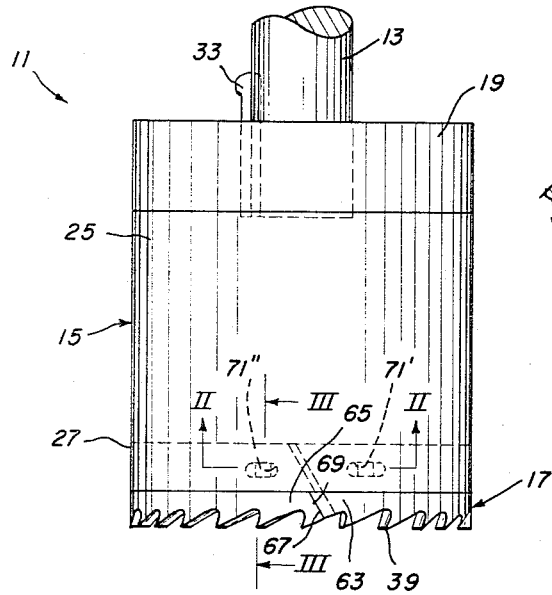
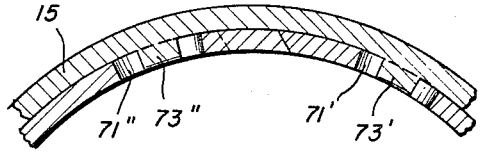
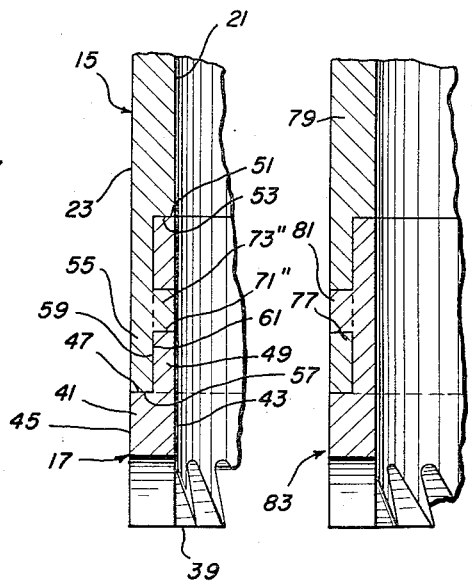
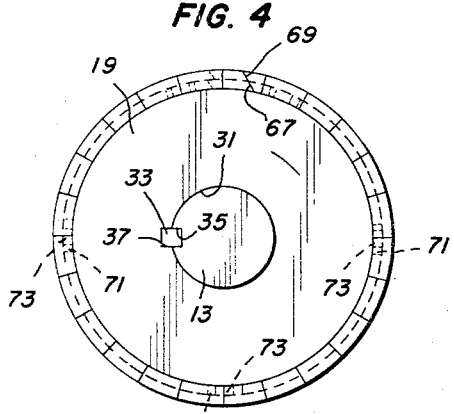
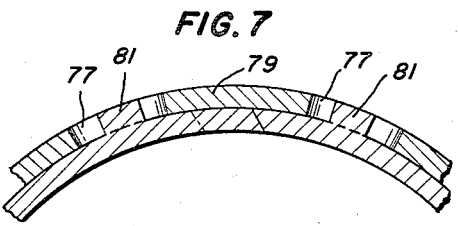
INVENTOR.
WALTER E. TREVATHAN
BY John R. Walker, III
Attorney March 26, 1968 W. E. TREVATHAN 3,374,696
BIT MEANS Filed Feb. 23, 1966 3 Sheets-Sheet 2

INVENTOR.
WALTER E. TREVATHAN
BY John R. Walker, III
Attorney

March 26, 1968   W. E. TREVATHAN   3,374,696
BIT MEANS
Filed Feb. 23, 1966   3 Sheets-Sheet 3

INVENTOR.
WALTER E. TREVATHAN
BY John R. Walker, III
Attorney

United States Patent Office 3,374,696
Patented Mar. 26, 1968

3,374,696
BIT MEANS
Walter E. Trevathan, McKenzie, Tenn., assignor to Walter Trevathan Corporation, a corporation of Tennessee
Filed Feb. 23, 1966, Ser. No. 529,490
8 Claims. (Cl. 77—69)

This invention relates to bit means and particularly relates to bit means of the type adapted to be attached to the rotating drive spindle means of a drilling machine or the like.

An object of the present invention is to provide bit means particularly useful for cutting substantially large holes or core portions in such material as wood, metal or stone.

A further object is to provide bit means useful for forming a circular or scalloped shaped cut on an end portion of a length of rod or tubestock, as for joining that cut end to the cylindrical lateral surface of another rod or tube.

A further object is to provide bit means having a replaceable cutting ring.

A further object is to provide a cutting ring substantially cheap to manufacture and a disposable ring which may be discarded when it becomes worn.

A further object is to provide such a cutting ring which is joined to the body member of the bit means by stepped portions respectively on the body member and the cutting ring which fit together in telescoping relationship to establish an annular wall of the bit means of substantially uniform thickness.

A further object is to provide projections on the cutting ring member or the body member which extend into apertures on the other member and securely hold the cutting ring in place.

A further object is to provide such a cutting ring which is split along a line slopping in such a manner and with the projections arranged in such a manner that during the heavy stresses that are placed on the bit means when in use, the cutting ring is securely held in place against removal from the body member.

A further object is to provide a modified form of the cutting ring in which the cutting ring is not split but is continuous.

The means by which the foregoing and other objects of the present invention are accomplished and the manner of their accomplishment will be readily understood upon reference to the accompanying drawing, in which:

FIG. 1 is an elevational view of the preferred embodiment of the bit means of the present invention illustrating the bit means attached to the drive spindle of a drilling machine with the drive spindle means being fragmentarily shown.

FIG. 2 is an enlarged fragmentary sectional view taken as on the line II—II of FIG. 1.

FIG. 3 is an enlarged fragmentary sectional view taken as on the line III—III of FIG. 1.

FIG. 4 is an end view of the bit means as viewed upwardly in FIG. 1 towards the cutting end of the bit means.

FIG. 5 is a fragmentary elevational view of a modified embodiment of the present invention.

FIG. 6 is an enlarged fragmentary sectional view taken as on the line VI—VI of FIG. 5.

FIG. 7 is an enlarged fragmentary sectional view taken as on the line VII—VII of FIG. 5.

Figure 8:
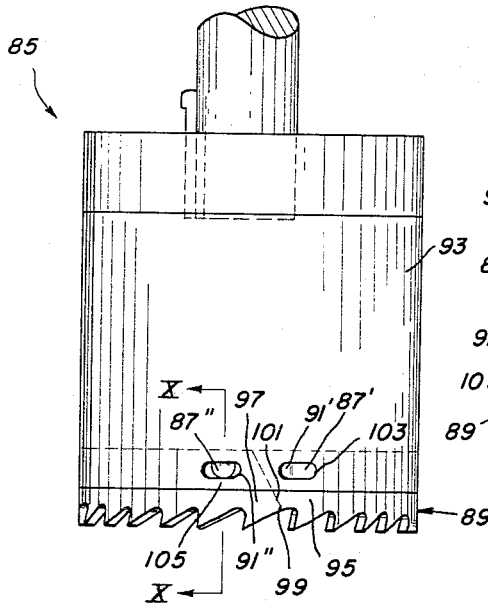
FIG. 8 is an elevational view similar to FIG. 1 of another modified embodiment of the bit means of the present invention.

The preferred form of the bit means illustrated in FIGS. 1–4 inclusive will first be described. The bit means indicated by numeral 11 is adapted to be removably attached to the drive spindle 13 of a drilling machine (not shown). Bit means 11 includes basically a tubular body member 15, a cutting ring 17 and an annular attachment member 19. The wall of tubular body member 15 is defined substantially by inside cylindrical surface 21, outside cylindrical surface 23, and proximal and distal end portions 25, 27 respectively. The upper circular proximal end portion 25 of tubular body 15 is fixedly attached by suitable means, as by welding, to the underside of attachment member 19. The axial bore opening of annular attachment member 19 is substantially defined by an inside cylindrical surface 31. Annular member 19 is snugly fittted to spindle 13 with inside cylindrical surface 31 fixedly engaging the outside cylindrical surface of spindle 13. A key member 33 fitted respectively in key slots 35, 37 respectively of spindle member 13 and attachment member 19 securely attach tubular body 15 to drive spindle 13.

Cutting ring 17 includes a plurality of cutting elements or teeth 39 arranged in a circumferentially extending row. If desired, cutting elements 39 may be in other forms, as for example, abrading material, without departing from the spirit and scope of the present invention. The main body portion 41 of cutting ring 17 is preferably the same thickness as body member 15 and is of the same radius as the body member. Thus, the wall or main body 41 of cutting ring 17 is defined substantially by an inside cylindrical surface 43 and an outside cylindrical surface 45 which are respectively in alignment with and correspond with surfaces 21, 23 when the cutting ring 17 is in place on body member 15. The upper or proximal end of cutting ring 17 is stepped, as best seen in FIG. 3, to provide an annular ledge 47 extending radially inwardly from outside cylindrical surface 45 to a place substantially halfway through the wall of the cutting ring and to provide a reduced portion 49 of the cutting ring 17 which is substantially half the thickness of main body 41 and which extends upwardly or remotely from ledge 47 adjacent the inside cylindrical surface 43 to its termination at the annular end 51. The distal end of body member 15 is stepped in a complementary manner to the stepped cutting ring so that the stepped portions overlap and mate in telescopic relationship as best seen in FIG. 3. Thus, body member 15 is provided with annular ledge 53, reduced portion 55 and annular end 57 which correspond to annular ledge 47, reduced portion 49 and annular end 51. As will be seen in FIG. 3, the outer annular face 59 of reduced portion 49 fits against the annular inner face 61 of reduced portion 55, annular end 57 fits against annular ledge 47 and annular end 51 fits against ledge 53 to establish the substantially annular overall wall of bit means 11 that extends from adjacent proximal end portion 25 to the distal or lower end of cutting ring 17.

Cutting ring 17 is divided along a line to provide a leading end 63 of cutting ring 17 and a trailing end 65 which respectively terminate at a leading face 67 and a trailing face 69 that are adjacent one another. Faces 67, 69 are preferably beveled or angled relative to the radius of bit means 11, as best seen in FIG. 4, and also slope upwardly from the distal end of cutting ring 17 towards the direction in which bit means 11 and body member 15 are adapted to rotate when in use. In other words, as will be seen in FIG. 1, the teeth 39 in the foreground in this figure will be moving to the left, and it will be seen that the leading and trailing faces 67, 69 are sloping upwardly to the left in this figure. Cutting ring 17 is provided with a plurality of apertures 71 preferably through reduced portion 49 of the cutting ring, which are circumferentially spaced around the cutting ring and which respectfully receive a corresponding one of a plurality of projections 73 fixedly attached to body member 15 on the reduced portion 55 thereof and which extend radially inwardly from the inside cylindrical surface 61. Projections 73 project into the apertures 71 but the ends thereof are substantially flush with the inside cylindrical surface 43 of the cutting ring. One of apertures 71' is provided in the cutting ring adjacent leading end 63 and another of the apertures 71" is provided in the cutting ring adjacent the trailing end 65, as best seen in FIG. 1. The apertures 71 are preferably elongated in a circumferential direction relative to the cutting ring 17.

It will be understood that in the use of bit means 11, projections 73 will engage cutting ring 17 adjacent the leading ends of the apertures 71 to cause the cutting ring 17 to rotate with the rotation of the body member 15. It will further be understood that with the projections 73 the cutting ring 17 will be securely held in place on the body member 15. Also, the arrangement of the trailing end 65 of the cutting ring 17 will be below the leading end 63 to hold the leading end in place.

It will be understood that in putting a cutting ring 17 in place in body member 15, the leading end 63 is first put into place and then the remainder of the cutting ring is sprung into place over projections 73.

The modified form of the bit means and indicated as at 75, shown in FIGS. 5–7, is like the preferred form except that the apertures 77 are in the body member 79 and the projections 81 are on the cutting ring 83.

Figure 10:
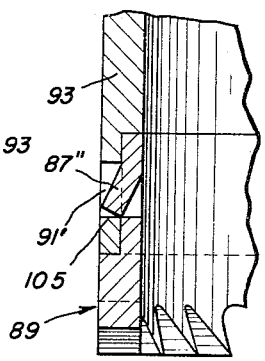
FIG. 10 is an enlarged fragmentary sectional view taken as on the line X—X of FIG. 8.
Figure 9:
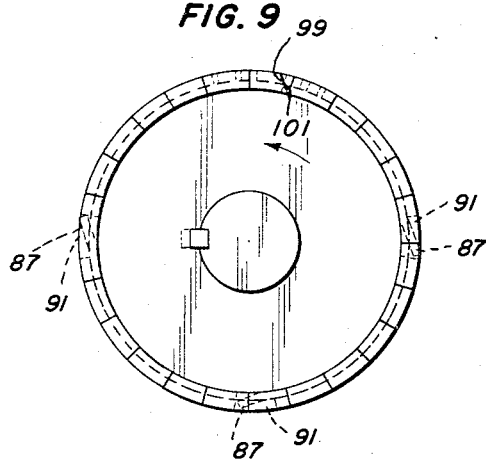
FIG. 9 is a view similar to FIG. 4 of the modified embodiment of FIG. 8.
Figure 11:
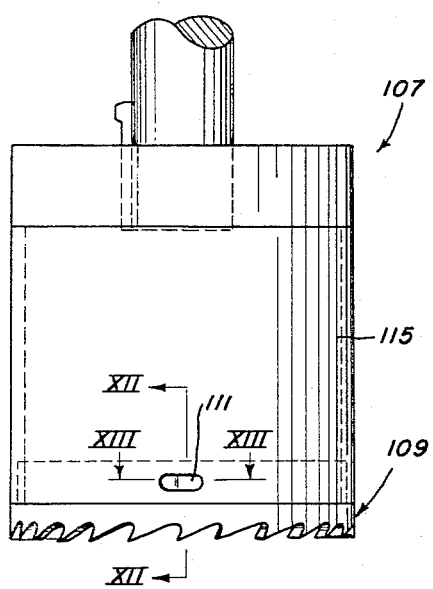
FIG. 11 is an elevational view similar to FIG. 1 of still another modified embodiment of the bit means of the present invention.
Figure 12:
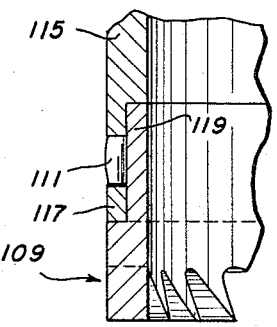
FIG. 12 is an enlarged fragmentary sectional view taken as on the line XII—XII of FIG. 11.
Figure 13:
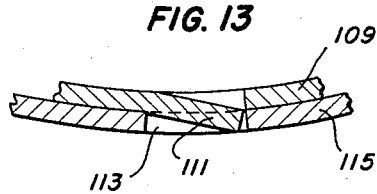
FIG. 13 is an enlarged fragmentary sectional view taken as on the line XIII—XIII of FIG. 11.
Figure 14:
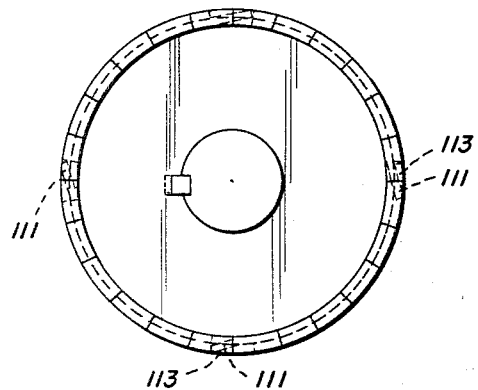
FIG. 14 is an end view similar to FIG. 4 of the modified embodiment of FIG. 11.

Referring now to the modified form of the bit means shown in FIGS. 8–10, and indicated as at 85, it is substantially like the modified form 75 except that the projections of bit means 85 are preferably formed from struck-out portions or tabs 87 which are struck-out from the cutting ring 89 of the modified form 85. The tabs 87 are substantially semi-circular and extend into corresponding apertures 91 provided in the body member 93 of modified form 85. The projections or tabs 87 may be struck-out in the cutting ring 89 either before or after insertion. Cutting ring 89 is preferably split along a line to establish the leading end 95 of the cutting ring and the trailing end 97, which respectively terminate in the leading face 99 and the trailing face 101 which are adjacent one another. Leading and trailing faces 99, 101 are sloped at an angle in the same manner as leading and trailing faces 67, 69 but the leading and trailing faces 99, 101 are not beveled at an angle relative to the radius of the bit means 85 of the modified form. This difference will be observed by the comparison of the leading and trailing faces 67, 69 as viewed in FIG. 4 with the leading and trailing faces 99, 101 as viewed in FIG. 9.

The tab 87' which is on leading end 95 extends substantially tangentially in a trailing direction into its corresponding one of the apertures 91' for engagement with a portion 103 of body member 93 adjacent the trailing end of the aperture. The tab 87" which is on cutting ring 89 adjacent the trailing end 97 thereof extends substantially at a right angle to tab 87' and generally towards the distal edge of cutting ring 89. Tab 87" extends into its corresponding one of the apertures 91" for engagement with the portion 105 of body member 93 which is adjacent the distal edge of the body member to prevent accidental removal of the trailing end 97 of the cutting ring 89. To install the cutting ring 89, in the event that the tabs 87 are formed before insertion into the body member 93, the leading end 95 is first put in place with the tab 87' secured in its corresponding aperture 91' and then the trailing end 97 is urged upwardly until the tab 87" snaps into place in its corresponding aperture 91".

Referring now to the modified form of the bit means of the present invention shown in FIGS. 11–14 and indicated as at 107, it in general is like modified form 85 except that the cutting ring 109 of bit means 107 is not split but is continuous completely around the cutting ring. Since there is no splitting of the cutting ring 109, there is no trailing or leading end, so that there are no tabs that correspond to the ones on the trailing and leading ends of modified form 85, but instead the tabs 111 on cutting ring 109 are preferably, though not necessarily, equally spaced around the cutting ring and preferably extend substantially tangentially in a trailing direction into the respective corresponding ones of the apertures 113 provided in body member 115 of modified form 107. It will be noted that in the embodiment 107, as in the previously described embodiments, the reduced portion 117 of body member 115 is on the outside of reduced portion 119 of cutting ring 109.

Figure 16:
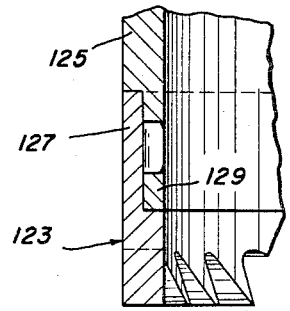
FIG. 16 is an enlarged fragmentary sectional view taken as on the line XVI—XVI of FIG. 15.
Figure 15:
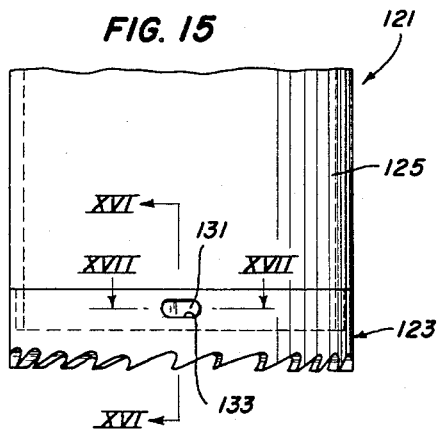
FIG. 15 is a fragmentary elevational view of an additional modified embodiment of the bit means of the present invention.
Figure 17:
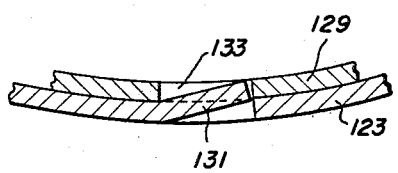
FIG. 17 is an enlarged fragmentary sectional view taken as on the line XVII—XVII of FIG. 15.

The modified embodiment of the bit means shown in FIGS. 15–17 and indicated as at 121 is substantially like embodiment 107 except that the stepped portions of the cutting ring 123 and body member 125 of embodiment 121 are reversed as compared with the embodiment 107. Thus, in the modified embodiment 121 the reduced portion 127 of cutting ring 123 is on the outside of reduced portion 129 of the body member 125. Also, the tabs 131 on cutting ring 123 extend inwardly into the apertures 133 in the body member 125 rather than outwardly as in embodiment 107.

From the foregoing, it will be understood that a very effective and efficient means is provided for securing the cutting ring to the tubular body member in a bit means so that the cutting member can be replaced without having to replace the entire bit means. In addition, it will be understood that such an arrangement is provided which prevents any accidental removal of the cutting member from the body member despite the tremendous stresses that are encountered during use of the bit means of the present invention.

Although the present invention has been described in some detail by way of example for purposes of clarity and understanding, it is to be understood that it is not to be so limited since changes and modifications may be made therein which are within the full intended scope of this invention as hereinafter claimed.

I claim:

1. Bit means for forming a circular cut in a piece of work material comprising an elongated tubular body member adapted for rotation about its longitudinal axis and having a proximal end and a distal end, a cutting ring member having a proximal end and a distal end provided with cutting means, said members respectively including adjacent the distal end of said body member, and adjacent the proximal end of said ring member overlapping and mating stepped portions respectively attached to said members and telescopically received together to establish a substantially annular wall of said bit means extending from adjacent said proximal end of said tubular body member to said distal end of said cutting ring member, one of said members being provided with apertures, the other of said members including projections projecting generally radially toward said one of said members and respectively into corresponding ones of said apertures for engagement with portions of said one of said members to secure said cutting ring member with respect to said body member.

2. The bit means of claim 1 in which said projections comprise struck-out tab portions on said cutting ring member and said apertures are located in said body member.

3. The bit means of claim 1 in which said projections are located on said body member and said apertures are located in said cutting ring member.

4. The bit means of claim 1 in which said cutting ring member is divided along a line sloping upwardly from the distal end of said cutting ring member towards the direction in which said tubular body member is adapted to rotate when in use to establish a leading end of said cutting ring member and a trailing end of said cutting ring member underlying said leading end.

5. The bit means of claim 4 in which said apertures are located in said body member and in which one of said projections is on said cutting member adjacent the leading end thereof and extends substantially tangentially in a trailing direction into its corresponding one of said apertures for engagement with a portion of said body member adjacent the trailing end of said one of said apertures, and in which another of said projections is on said cutting member adjacent the trailing end thereof and extends substantially at a right angle to said one of said projections and generally towards the distal end of said cutting member into its corresponding one of said apertures for engagement with a portion of said body member adjacent the distal edge of said body member to prevent accidental removal of said trailing end of said cutting member from said body member.

6. The bit means of claim 1 in which said stepped portions are arranged with the stepped portion of said body member being outside of the stepped portion of said cutting ring.

7. The bit means of claim 1 in which said cutting ring comprises one continuous piece.

8. The bit means of claim 7 in which said stepped portions are arranged with the stepped portion of said cutting ring outside of the stepped portion of said body member.

References Cited

UNITED STATES PATENTS

| 2,015,339 | 9/1935 | Ellingham | 143—85.1 |
| 2,779,361 | 1/1957 | McKiff | 77—69 XR |

FOREIGN PATENTS

| 170,193 | 10/1921 | Great Britain. |

FRANCIS S. HUSAR, *Primary Examiner.*